TAPE HANDLING MACHINE

Filed March 13, 1958

2 Sheets-Sheet 1

INVENTOR.
WAYNE E. SCHOBER
BY Merchant & Merchant
ATTORNEYS

March 6, 1962 W. E. SCHOBER 3,023,943

TAPE HANDLING MACHINE

Filed March 13, 1958

2 Sheets-Sheet 2

INVENTOR.

WAYNE E. SCHOBER

BY Merchant & Merchant

ATTORNEYS 3,023,943

TAPE HANDLING MACHINE

Wayne E. Schober, Minneapolis, Minn., assignor to Viking of Minneapolis, Inc., Minneapolis, Minn., a corporation of Minnesota Filed Mar. 13, 1958, Ser. No. 721,242
8 Claims. (Cl. 226—181)

My present invention relates to improvements in tape handling machines and more particularly to the tape driving mechanisms of such machines. While the invention is applicable to drive mechanisms for tape or ribbon material without regard to the use characteristic of the material, the invention nevertheless has been found to be of particular advantage when employed in the drive mechanism of magnetic tape in tape recording and reproducing machines. In the particular machine illustrated a suitable magnetic tape, either unrecorded or pre-recorded, is supplied in cartridge contained form through the medium of a suitable cartridge of the continuous loop-type wherein an endless tape is wound upon a single reel or spool from which, in use, it is removed and to which it is simultaneously returned; the tape being, in fact, wound off the bottom of the coil of tape on the spool and being rewound on the perimeter of the coil. While the invention hereof is not limited to use in connection with machines employing such cartridge supplied tapes, it does nevertheless have particular advantages in machines employing such cartridge type tapes.

In most tape handling machines of the present day the tapes are driven at a constant speed through a power operated capstan with which the tape is maintained in frictional driving engagement by a suitable pressure roller. For the purpose of loading and unloading any such machine it is necessary to retract the pressure roller to an inoperative position sufficiently spaced from the capstan to allow insertion of the tape between the capstan and pressure roller but in machines designed to handle cartridge contained tapes, such as the one disclosed herein, the amount of movement of the pressure roller between normal inoperative and normal operative positions is much greater than in presently more conventional types of tape handling machines. In fact, it is desirable in cartridge tape handling machines to move the pressure roller from a normal vertical axis position above the deck of the machine to a generally horizontal axis position below the deck of the machine to allow the cartridge to be slid over the deck to an operative position without interference from the pressure roller.

A particular object of the instant invention is the provision of an improved control mechanism for the pressure rollers of tape handling machines, whereby the pressure roller can be quickly moved from an inoperative position materially spaced from the capstan to an operative position against the tape in engagement with the capstan and locked in its operative position all by a single unidirectional movement of a conventionally located control element, and this substantially irrespective of the length of the field of movement of the pressure roller between its operative and inoperative positions.

A further object of the invention is the provision of a mechanism of the general character described immediately above involving adjustable means whereby the degree of driving pressure exerted by the pressure roller on the tape and capstan at the operative position of the pressure roller, as the result of a definitely limited unidirectional control movement, may be preadjusted.

The above and other highly important objects and advantages of the invention will become apparent from the following detailed specification, claims and appended drawings.

In the accompanying drawings like characters indicate like parts throughout the several views.

Referring to the drawings.

Figure 3:
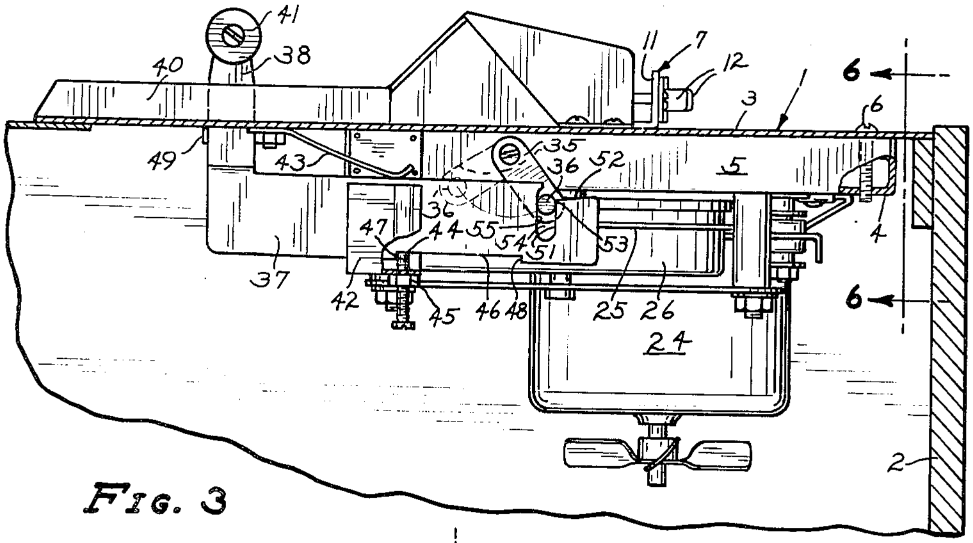
FIG. 3 is a view corresponding to FIG. 2 but showing certain of the parts in their inoperative positions.
Figures 4, 5, 6:
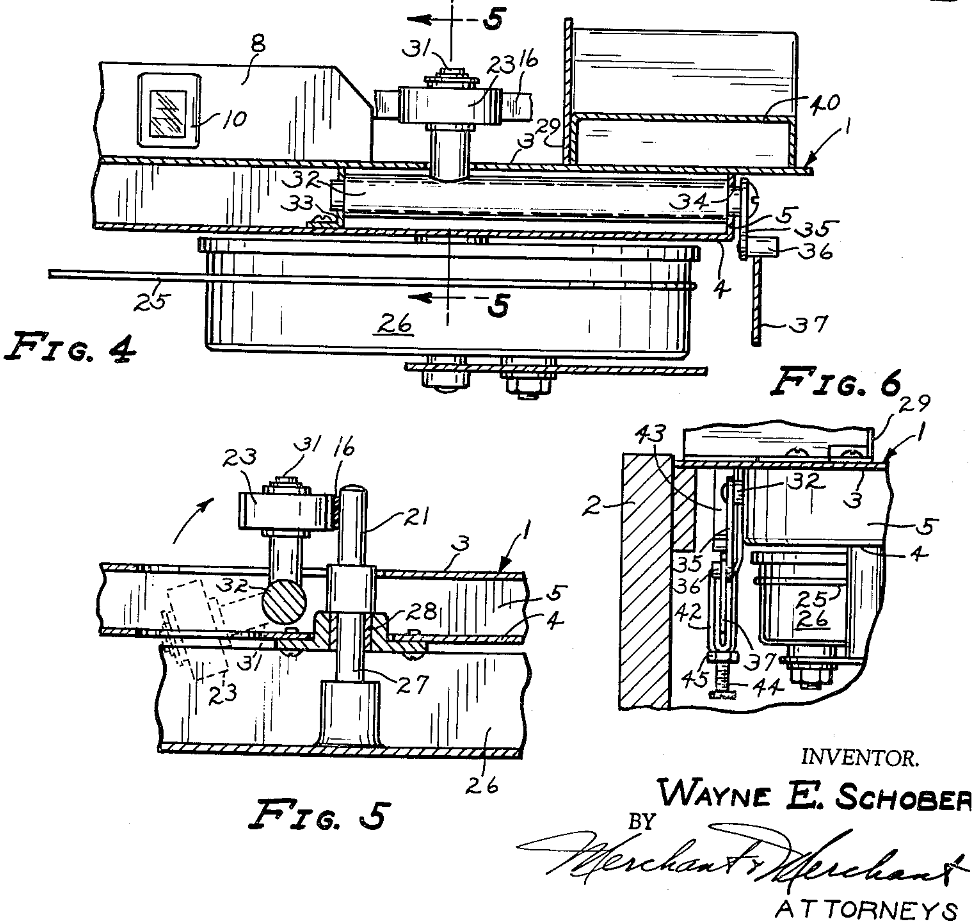
FIG. 4 is a further enlarged fragmentary detail sectional view taken approximately on the line 4—4 of FIG. 1.

FIG. 5 is a fragmentary detail view on the scale of FIG. 4 and taken on the line 5—5 of FIG. 4; and FIG. 6 is a fragmentary sectional view taken on the line 6—6 of FIG. 3 but to the enlarged scale of FIGS. 4 and 5.

Figures 1, 2:
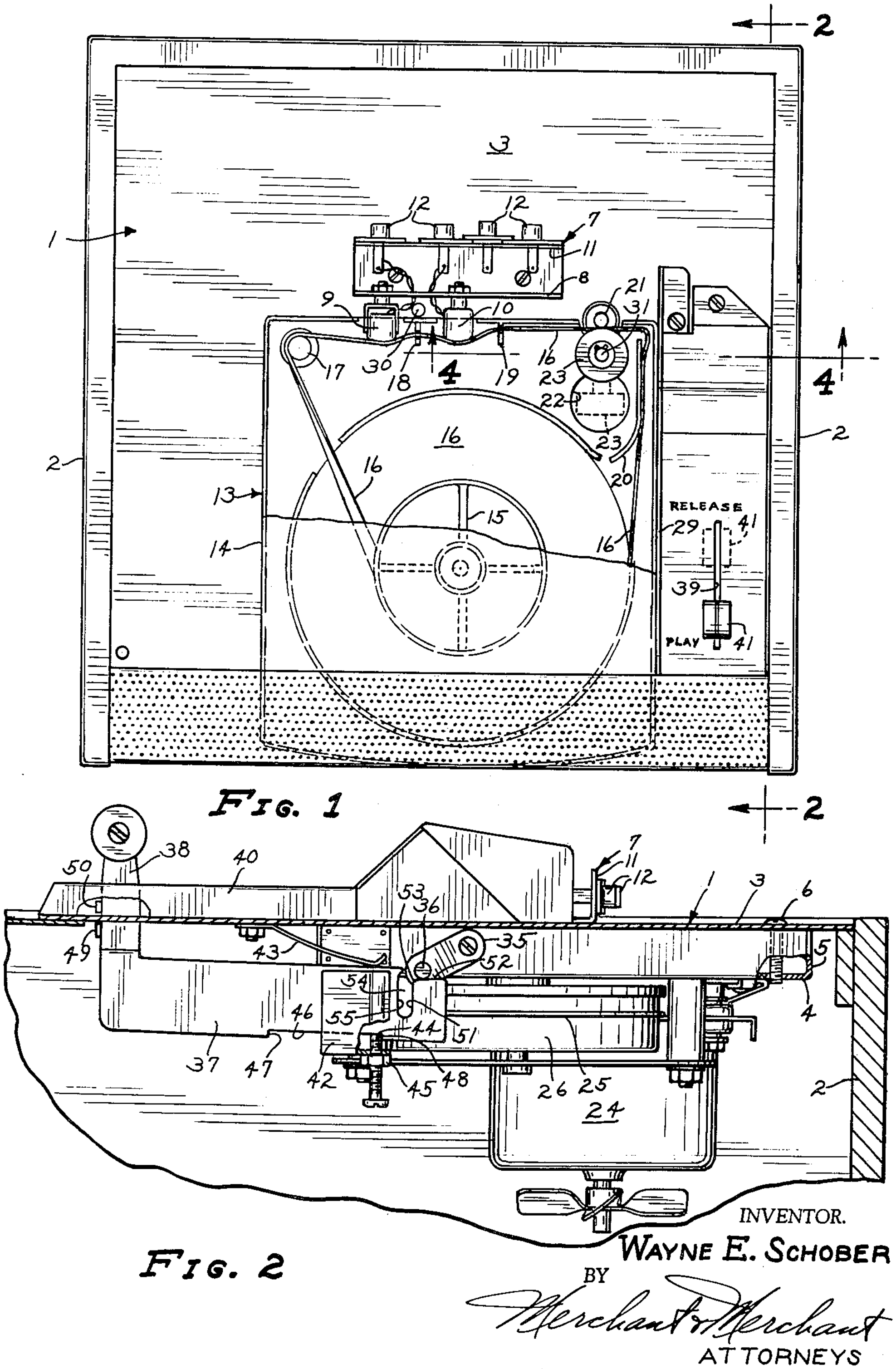
FIG. 1 is a top plan view of a machine embodying the invention and which machine was earlier herein more specifically identified.
FIG. 2 is an enlarged fragmentary sectional view taken approximately on the line 2—2 of FIG. 1 and showing certain of the elements of the invention in their operative positions.

In connection with the above described figures it will be noted that the tape cartridge has been shown only in FIG. 1.

All of the parts of the tape handling machine herein illustrated are mounted on and carried by a deck 1 which provides the upper wall of a casing structure further comprising side walls 2. The deck 1 is a composite structure comprising an upper deck plate 3 seated directly on the upper portions of the walls 2 and a sub-panel 4 carried by the deck plate 3 and disposed in downwardly spaced relation to the latter. The sub-panel 4 is a pan-shaped affair comprising upturned side flanges 5 seated directly against the bottom of the deck plate 3 and secured to the deck plate 3 by means of screws or the like 6 threaded in the sub-panel 4.

Mounted on the upper surface of deck plate 3 of deck 1 is an elongated cross sectionally U-shaped mounting bracket 7 adapted to carry and position one or more electromagnetic heads. As shown, for the purpose of example, there are two such heads mounted on the front or lower flange 8 of bracket 7; one being a commercially-available erase head 9 and the other being a commercially-available recording and/or playback head or transducer 10. Carried by the rear flange 11 of the bracket 7 is a plurality of conventional pin jacks 12, one of which is electrically connected to the winding, not shown, of erase head 9 and the other of which is electrically connected to the winding, not shown, of the recording and/or playback head or transducer 10, and two of which remain unused in the present situation.

In the drawings hereof the tape cartridge is indicated as an entirety by 13, the outer shell thereof by 14, the single journalled tape reel or spool by 15, the magnetic tape by 16, a cylindrical tape guide post by 17 and tape guiding flanges by 18, 19 and 20, respectively, over which the tape travels during its passage from and back to the long endless coil of tape on the spool or reel 15. The cartridge 13 is provided in its end wall adjacent the bracket 7 with openings to receive the heads 9 and 10 and to receive a capstan 21 and is provided in its bottom wall with an aperture 22 to receive the capstan pressure roller 23 that cooperates with the capstan to drive or transport the tape from and back to the coil on the cartridge spool 15. In this particular machine the pressure roller 23, which is usually of rubber, is swingably retractable from its operative position shown and wherein it presses the magnetic tape 16 into tight frictional engagement with the capstan 21 to an inoperative position below the upper surface of the deck plate 3 and for which purpose there is provided in the deck plate 3 an aperture generally corresponding to and generally aligned with the aperture 22 in the bottom of the cartridge shell 14.

Insofar as the instant invention is concerned, the capstan 21 may be power driven at a constant speed or at different selected constant speeds by any suitable drive mechanism, conventional or otherwise. However, in the machine illustrated the capstan drive mechanism, which is only partially illustrated, comprises a constant speed electric motor 24, a motor driven resilient belt 25 and a large diameter speed reducing, flywheel-acting pulley 26 mounted fast on a spindle 27, the upper end portion of which defines the capstan 21. This capstan spindle 27 is journalled in the sub-panel 4 by means of a bearing 28. As shown, the capstan 21 projects through and above the upper deck plate 3 and is disposed with its axis generally normal to the plane of the deck plate 3 or generally vertical when the deck plate 3 is horizontally disposed. Of course the machine may be used with the deck disposed in various positions other than horizontal and for that reason it must be appreciated that the terms upper, lower, vertical and horizontal are used herein to describe the relationship of various elements when the deck of the machine is in a horizontal position.

As an aid to properly positioning the cartridge 13 with relation to the capstan 21 and heads 9 and 10 there is provided on the upper surface of the deck plate 3 an upstanding guide flange 29. For the purpose of applying and removing the tape cartridge 13 the capstan pressure roller 23 is retracted to a below-deck position. This permits the application and removal of the tape cartridge 13 by sliding it forth and back on the deck plate 3 while maintained in proper alignment against the side of guide flange 29. For the purpose of definitely establishing the operative position of the tape cartridge 13 there is provided on the deck plate 3 an upwardly projecting stop 30 against which the tape cartridge shell is seated when in its operative position shown in FIG. 1.

The pressure roller 23 is freely journalled on the projecting end of a stub shaft 31 that is rigid with and projects radially from the intermediate portion of an oscillatory shaft 32 that is pivotally mounted to the deck plate structure 1 at 33 and 34 for oscillatory movements such as will move the pressure roller 23 between its extreme operative and inoperative positions shown in the drawings. The axis of the oscillatory shaft 32 is generally normal to and radially offset from the axis of the capstan 21 and is in a plane offset from the tape engaging surface of the capstan in a direction parallel to the capstan axis.

The oscillatory shaft 32 is provided at one end with a crank arm 35 carrying a projecting crank pin 36. The extreme operative position of the pressure roller 23 is shown in FIGS. 1, 4 and 5 and the equivalent extreme operative positions of the crank arm 35 and crank pin 36 are shown in FIGS. 2 and 4. The extreme inoperative position of the pressure roller 23 is shown by dotted lines in FIG. 5 and the equivalent inoperative position of the crank arm 35 and pin 36 are shown by full lines in FIG. 3. By reference to the drawings it will be noted that the length of arcuate travel of the pressure roller 23 and crank pin equipped arm 35 is materially less than 180° and is, in fact, approximately 90° of arcuate movement.

The pressure roller control mechanism hereof further comprises a slide bar 37 underlying the deck 1 and having an upwardly extended handle portion 38 that works through a suitable slot or opening, not shown, in the deck plate 3 and a slot 39 aligned with the said deck plate opening and formed in an auxiliary inverted U-shaped deck element 40. The handle 38 is preferably provided at its upper end with finger knobs 41.

The slide 37 extends substantially parallel to the deck 1 and is mounted and guided for longitudinal straight line sliding movements in a path intersecting the field of arcuate movement of the crank pin and parallel to a plane normal to the axis of the oscillatory shaft 32. It will be further noted that the path of sliding movement of the slide 37 is generally parallel to a plane that is parallel to the axis of the oscillatory shaft 32 and intersects the extreme operative and inoperative positions of the crank pin 36.

The slide 37 is formed of flat sheet metal and is mounted and guided between opposite flanges of a generally U-shaped guide bracket 42 that depends rigidly from the deck structure 1. The intermediate portion of the slide is yieldingly urged in a downward direction with respect to FIGS. 2 and 3, by a deck-carried leaf spring 43, against one end of an adjustable bearing screw 44 that is screw threaded in the bottom of the bracket 42 and is locked in adjusted position by a lock nut 45. The bottom portion of the slide 37 is recessed to provide a flat smooth bearing surface 46 that works slidably over the end of the bearing screw 44 and to further provide spaced stop shoulders 47 and 48 that cooperate with the bearing screw 44 to establish the extreme inoperative and operative positions of the slide 37. Vertical rocking movements of the slide 37 on the bearing screw 44 are resisted by spaced stop lugs 49 and 50 on the slide handle 38 and which respectively underlie and overlie the deck plate 3.

The slide 37 is provided with generally contiguous primary and secondary crank pin engaging cam surfaces 51 and 52 that are angularly disposed with respect to one another and are connected by a shoulder portion 53. primary cam surface 51 extends from the shoulder portion 53 in a direction generally normal to the path of movement of the slide and the secondary cam surface 52 extends from said shoulder portion in a direction generally opposite to the direction of movement of the slide when the latter is passing from its inoperative to its operative position. In a general way it may be said that the secondary cam surface 52 is generally or nearly parallel to the path of movement of the slide. However, preferably and as shown, this secondary cam surface 52 outwardly diverges from a plane parallel to the path of movement of the slide and intersectitng the said shoulder 53. Preferably, also, the primary cam surface 51 of the slide is defined by one wall of a slide slot 54 and which slot is closed at its bottom end but is open adjacent its upper end in the vicinity of the shoulder 53. The crank pin is always yieldingly urged in a downward direction (toward its inoperative position) by gravity, the action of which is relied upon to keep the crank pin seated on the secondary cam surface 52, and the force of which will usually be sufficient to cause the crank pin to drop into the slot 52 when it becomes aligned with the slot. Obviously, of course, gravity can be relied upon to yieldingly urge the crank pin equipped arm 35 and pressure roller 23 toward their inoperative positions only when the deck 1 is in a generally horizontal position. Hence it will be obvious that it may be desirable to provide a suitable spring to yieldingly urge the crank arm 35 toward its inoperative position. It will also be noted that the wall of slot 54 opposite the cam surface 51 extends upwardly to a plane above the shoulder 53 so as to positively intersect the crank pin 36 as the secondary cam surface 52 of the slide passes off of the crank pin.

*Operation*

For the purpose of insertion and removal of the tape cartridge 13 the pressure roller 23 is retracted to its lower extreme inoperative position, shown best by dotted lines in FIG. 5, and in which position it is disposed below the plane of the upper surface of the deck 1; this inoperative position of the pressure roller 23 being brought about by moving the slide to its extreme right-hand position with respect to FIGS. 2 and 3 and by the combined result of the force of gravity and the action of slot wall 55 on the crank pin 36. When the tape cartridge 13 is operatively positioned the tape 16 will be disposed adjacent to and substantially in contact with the capstan 21. To provide suitable frictional driving engagement between the capstan 21 and tape 16 the pressure roller 23 is moved to its extreme operative position, shown by full lines in FIGS. 1, 4 and 5, by now shifting the slide 37 to its extreme lefthand operative position with respect to FIGS. 2 and 3; this being the slide position shown by full lines in FIG. 2. In other words the pressure roller 23 is moved from its inoperative below-deck position, shown by dotted lines in FIG. 5, to its above-deck extreme operative position, shown by full lines in FIGS. 1, 4 and 5, by moving the slide 37 from its full line position of FIG. 3 to its opposite full line position of FIG. 2. During the major part of the movement of the slide 37 toward its operative position, and in a direction from right to left with respect to FIG. 3, the crank pin 36 is engaged by and slides on the primary cam surface 51 and moves at a rapid rate with respect to the rate of travel of the slide 37. However, when the crank pin 36 passes over the shoulder 53 its rate of movement with respect to the slide is rapidly decreased. When the crank pin finally passes on to the secondary cam surface 52 it will be engaged by the latter at such an angle as to become locked in a generally operative position due to the angulation of the surface 52 with respect to the arcuate path of travel of the crank pin. Any further movement of the slide 37 toward its extreme operative position will only result in a very slow but powerful movement of the crank pin due to the inclination or divergence of said cam surface 52 with respect to a plane parallel to the path of movement of the slide 37. The degree of frictional driving pressure exerted between the tape 16 and capstan 21 by the pressure roller 23 is determined by adjustment of the bearing screw 44.

While I have shown and described the preferred embodiment of my novel device it will be understood that the same is capable of modification without departure from the spirit and scope of the invention as defined in the claims.

What I claim is:

1. In a tape handling machine, tape drive mechanism comprising a journalled power driven capstan having a surface for frictional driving engagement with one side of a tape to be driven thereby, an oscillatory shaft mounted for oscillation about an axis generally normal to and radially offset from the capstan axis and in a plane offset from the tape engaging surface of the capstan in a direction generally parallel to the capstan axis, an idler pressure roller for engagement with the side of the tape opposite that engaged by the capstan to maintain the tape in frictional driving engagement with the capstan, means mounting said pressure roller on said oscillatory shaft for oscillatory movements therewith and for rotation with respect thereto and in such radially spaced relation to the shaft axis that under oscillatory pivotal movements of the shaft the pressure roller will swing through an arc between an operative position adjacent the capstan and an inoperative position materially spaced from the capstan, a crank arm fast on said oscillatory shaft carrying a crank pin and movable to operative and inoperative positions corresponding to those of the roller, the length of the field of arcuate travel of the crank pin equipped arm and pressure roller between their operative and inoperative positions being less than 180°, and means for moving the crank pin equipped arm together with the oscillatory shaft and pressure roller back and forth between their inoperative and operative positions and automatically locking the same in their operative positions, said last-named means comprising a slide mounted and guided for straight line sliding movements in a path that is generally normal to the axis of the oscillatory shaft to engage the crank pin at its extreme operative and inoperative positions said slide being in the form of a cam having relatively angularly disposed generally contiguous primary and secondary crank pin engaging cam surfaces connected by a shoulder, the primary crank pin engaging cam surface extending from said shoulder in a direction generally normal to the path of movement of the slide and the secondary crank pin engaging cam surface of the slide extending from said shoulder in a direction generally opposite to the direction of movement of the slide when passing from the inoperative to the operative position of the crank pin, the said primary cam surface being disposed to engage the crank pin when the latter is in its extreme inoperative position and throughout the arcuate movement of the latter from its inoperative position to a position of close proximity to its operative position, said shoulder being disposed to engage the crank pin when the latter reaches a position of close proximity to its extreme operative position and to impart movement to the latter toward its operative position a distance approximately equal to the radius of the crank pin, and said secondary cam surface engaging and locking the crank pin in its extreme operative position.

2. In a tape handling machine, tape drive mechanism comprising a journalled power driven capstan having a surface for frictional driving engagement with one side of a tape to be driven thereby, an oscillatory shaft mounted for oscillation about an axis generally normal to and radially offset from the capstan axis and in a plane offset from the tape engaging surface of the capstan in a direction generally parallel to the capstan axis, an idle pressure roller for engagement with the side of the tape opposite that engaged by the capstan to maintain the tape in frictional driving engagement with the capstan, means mounting said pressure roller on said oscillatory shaft for oscillatory movements therewith and for rotation with respect thereto and in such radially spaced relation to the shaft axis that under oscillatory pivotal movements of the shaft the pressure roller will swing through an arc between an operative position adjacent the capstan and an inoperative position materially spaced from the capstan, a crank arm fast on said oscillatory shaft carrying a crank pin and movable to operative and in operative positions corresponding to those of the roller, the length of the field of arcuate travel of the crank pin equipped arm and pressure roller between their operative and inoperative positions being less than 180°, and means for moving the crank pin equipped arm together with the oscillatory shaft and pressure roller back and forth between their inoperative and operative positions and automatically locking the same in their operative positions, said last-named means comprising a slide mounted and guided for straight line sliding movements in a path that is generally normal to the axis of the oscillatory shaft and which engages the crank pin at its extreme operative and inoperative positions, said slide having relatively angularly disposed generally contiguous primary and secondary crank pin engaging cam surfaces connected by a shoulder, the primary crank pin engaging cam surface extending from said shoulder in a direction generally normal to the path of movement of the slide and the secondary crank pin engaging-cam surface of the slide extending from said shoulder in a direction generally opposite to the direction of movement of the slide when passing from the inoperative to the operative position of the crank pin, the said primary cam surface being disposed to engage the crank pin when the latter is in its extreme inoperative position and throughout the arcuate movement of the latter from its inoperative position to a position of close proximity to its operative position, said shoulder being disposed to engage the crank pin when the latter reaches a position of close proximity to its extreme operative position and to impart movement to the latter toward its operative position a distance approximately equal to the radius of the crank pin, and said secondary cam surface engaging and locking the crank pin in its extreme operative position, said secondary cam surface diverging gradually from said shoulder, whereby the secondary surface will exert a slow but powerful and unidirectional non-reactive cam action on the crank pin and pressure roller to obtain and retain the desired frictional driving pressure between the tape and capstan.

3. In a tape handling machine, tape drive mechanism comprising a journalled power driven capstan having a surface for frictional driving engagement with one side of a tape to be driven thereby, an oscillatory shaft mounted for oscillation about an axis generally normal to and radially offset from the capstan axis and in a plane offset from the tape engaging surface of the capstan in a direction generally parallel to the capstan axis, an idle pressure roller for engagement with the side of the tape opposite that engaged by the capsan to maintain the tape in frictional driving engagement with the capstan, means mounting said pressure roller on said oscillatory shaft for oscillatory movements therewith and for rotation with respect thereto and in such radially spaced relation to the shaft axis that under oscillatory pivotal movements of the shaft the pressure roller will swing through an arc between an operative position adjacent the capstan and an inoperative position materially spaced from the capstan, a crank arm fast on said oscillatory shaft carrying a crank pin and movable to operative and inoperative positions corresponding to those of the roller, the length of the field of arcuate travel of the crank pin equipped arm and pressure roller between their operative and inoperative positions being less than 180°, and means for moving the crank pin equipped arm together with the oscillatory shaft and pressure roller back and forth between their inoperative and operative positions and automatically locking the same in their operative positions, said last-named means comprising a slide mounted and guided for straight line sliding movements in a path that is generally normal to the axis of the oscillatory shaft and which engages the crank pin at its extreme operative and inoperative positions, said slide being in the form of a cam having relatively angularly disposed generally contiguous primary and secondary crank pin engaging cam surfaces connected by a shoulder, the primary crank pin engaging cam surface extending from said shoulder in a direction generally normal to the path of movement of the slide and the secondary crank pin engaging cam surface of the slide extending from said shoulder in a direction generally opposite to the direction of movement of the slide when passing from its inoperative to its operative position, the said primary cam surface being disposed to engage the crank pin when the latter is in its extreme inoperative position and throughout the arcuate movement of the latter from its inoperative position to a position of close proximity to its operative position, said shoulder being disposed to engage the crank pin when the latter reaches a position of close proximity to its extreme operative position and to impart movement to the latter toward its operative position a distance approximately equal to the radius of the crank pin, and said secondary cam surface engaging and locking the crank pin in its extreme operative position, the slide defining spaced parallel walls of a crank pin receiving slot and the said primary cam surface comprising one of said slot walls, and the last said slot wall also defining said shoulder.

4. In a tape handling machine, tape drive mechanism comprising a journalled power driven capstan having a surface for frictional driving engagement with one side of a tape to be driven thereby, an oscillatory shaft mounted for oscillation about an axis generally normal to and radially offset from the capstan axis and in a plane offset from the tape engaging surface of the capstan in a direction generally parallel to the capstan axis, an idle pressure roller for engagement with the side of the tape opposite that engaged by the capstan to maintain the tape in frictional driving engagement with the capstan, means mounting said pressure roller on said oscillatory shaft for oscillatory movements therewith and for rotation with respect thereto and in such radially spaced relation to the shaft axis that under oscillatory pivotal movements of the shaft the pressure roller will swing through an arc between an operative position adjacent the capstan and an inoperative position materially spaced from the capstan, a crank arm fast on said oscillatory shaft carrying a crank pin and movable to operative and inoperative positions corresponding to those of the rollers, the length of the field of arcuate travel of the crank pin equipped arm and pressure roller between their operative and inoperative positions being less than 180°, and means for moving the crank pin equipped arm together with the oscillatory shaft and pressure roller back and forth between their inoperative and operative positions and automatically locking the same in their operative positions, said last-named means comprising a slide mounted and guided for straight line sliding movements in a path that is generally normal to the axis of the oscillatory shaft and which engages the crank pin at its extreme operative and inoperative positions, said slide being in the form of a cam having relatively angularly disposed generally contiguous primary and secondary crank pin engaging cam surfaces connected by a shoulder, the primary crank pin engaging cam surface extending from said shoulder in a direction generally normal to the path of movement of the slide and the secondary crank pin engaging cam surface of the slide extending from said shoulder in a direction generally opposite to the direction of movement of the slide when passing from its inoperative to its operative position, the said primary cam surface being disposed to engage the crank pin when the latter is in its extreme inoperative position and throughout the arcuate movement of the latter from its inoperative position to a position of close proximity to its operative position, said shoulder being disposed to engage the crank pin when the latter reaches a position of close proximity to its extreme operative position and to impart movement to the latter toward its operative position a distance approximately equal to the radius of the crank pin, and said secondary cam surface engaging and locking the crank pin in its extreme operative position, the slide defining spaced parallel walls of a crank pin receiving slot and the said primary cam surface comprising one of said slot walls, the last said slot wall also defining said shoulder, and the other of said slot walls terminating at a point opposite said shoulder.

5. In a tape handling machine, tape drive mechanism comprising a power driven capstan having a surface for frictional driving engagement with one side of a tape to be driven thereby, an idle pressure roller for engagement with the side of the tape opposite that engaged by the capstan to maintain the tape in frictional engagement with the capstan, means supporting the pressure roller with freedom for rotation on its own axis and mounted for swinging movements in an arcuate path to move the roller toward and from the capstan btween an operative position adjacent the capstan and an inoperative position materially spaced from the capstan and which arcuate path is generally radial of the capstan axis, a crank pin carried by the pressure roller supporting means and extending generally parallel to but spaced radially from the axis of swinging movements of the pressure roller supporting means, and means for moving the crank pin and pressure roller supporting means back and forth between inoperative and operative positions corresponding to those of the roller and automatically locking the same in their operative position, said last-named means comprising a slide mounted and guided for straight line sliding movements in a path that is generally parallel to the plane of the arcuate path to engage the crank pin at its extreme operative and inoperative positions, said slide being in the form of a cam having relatively angularly directed generally contiguous primary and secondary crank pin engaging cam surfaces connected by a shoulder and disposed in a plane that is generally normal to the crank pin axis and intersects the crank pin in all positions thereof, the primary crank pin engaging cam surface extending from said shoulder in a direction angular to the direction of the path of movement of the slide and the secondary crank pin engaging surface of the slide extending from the shoulder in a direction generally opposite to the direction of movement of the slide when passing from the inoperative to the operative position of the crank pin, said primary cam surface being disposed to engage the crank pin when the latter is in its extreme inoperative position and throughout the arcuate movement of the latter from its inoperative position to a position of close proximity to its operative position, said shoulder being disposed to engage the crank pin when the latter reaches a position of close proximity to its extreme operative position and to impart movement to the crank pin toward its operative position at a progressively reduced rate per unit of slide travel as crank pin moves with the supporting means, and said secondary cam surface engaging and locking the crank pin in its extreme operative position.

6. The structure defined in claim 5 wherein the said secondary cam surface diverges gradually from said shoulder.

7. The structure defined in claim 5 wherein the slide defines spaced parallel walls of a crank pin receiving slot and wherein the said primary cam surface comprises one of said slot walls, and the last said slot wall also defining said shoulder.

8. The structure defined in claim 5 wherein the slide defines spaced parallel walls of a crank pin receiving slot and wherein the said primary cam surface comprises one of said slot walls, the last said slot wall also defining said shoulder, and the other of said slot walls terminating at a point opposite said shoulder.

References Cited in the file of this patent

UNITED STATES PATENTS

| | | |
|---|---|---|
| 2,180,501 | Blood | Nov. 21, 1939 |
| 2,828,123 | Guillemette | Mar. 25, 1958 |
| 2,876,005 | Eash | Mar. 3, 1959 |